(12) United States Patent
Hagihara et al.

(10) Patent No.: US 9,735,832 B2
(45) Date of Patent: Aug. 15, 2017

(54) COMMUNICATION SYSTEM AND COMMUNICATION DEVICE

(75) Inventors: Takeshi Hagihara, Osaka (JP); Yutaka Komatsu, Osaka (JP); Tatsuya Izumi, Osaka (JP); Kazuhiko Nii, Osaka (JP); Ryou Okada, Osaka (JP); Yousuke Takata, Osaka (JP); Hiroya Andoh, Aichi (JP); Yuta Ochiai, Aichi (JP); Ryuichi Kamaga, Aichi (JP); Atsushi Iwai, Aichi (JP); Yukihiro Miyashita, Aichi (JP); Nobuyuki Nakagawa, Aichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 327 days.

(21) Appl. No.: 14/232,218

(22) PCT Filed: Jul. 13, 2012

(86) PCT No.: PCT/JP2012/067960
§ 371 (c)(1),
(2), (4) Date: May 28, 2014

(87) PCT Pub. No.: WO2013/008921
PCT Pub. Date: Jan. 17, 2013

(65) Prior Publication Data
US 2014/0292069 A1    Oct. 2, 2014

(30) Foreign Application Priority Data
Jul. 13, 2011 (JP) .................................. 2011-155224

(51) Int. Cl.
*H04B 3/54* (2006.01)
*B60R 16/023* (2006.01)
*B60L 11/18* (2006.01)

(52) U.S. Cl.
CPC ............ *H04B 3/54* (2013.01); *B60L 11/1818* (2013.01); *B60L 11/1824* (2013.01);
(Continued)

(58) Field of Classification Search
None
See application file for complete search history.

(56) References Cited

U.S. PATENT DOCUMENTS 2,634,334 A    4/1953 Kalb .............................. 370/488
3,916,322 A    10/1975 Nelson
(Continued)

FOREIGN PATENT DOCUMENTS

CN    101099302 A    1/2008
CN    101803143 A    8/2010
(Continued)

OTHER PUBLICATIONS

Cyriacus Bleijs, Low-cost charging systems with full communicatino capability, May 13, 2009, EVS, 24.*
(Continued)

*Primary Examiner* — Rexford Barnie
*Assistant Examiner* — Swarna N Chowdhuri
(74) *Attorney, Agent, or Firm* — McDermott Will & Emery LLP (57) ABSTRACT

An output circuit sends a control pilot signal generated in a voltage generator to an input circuit. A communication unit is connected between an earthed wire and a control pilot wire on the output side of the output circuit via a bandpass filter. A communication unit is connected between the earthed wire and the control pilot wire on the input side of (Continued)

the input circuit via a bandpass filter. A low-pass filter is interposed between the output circuit and the communication unit. A low-pass filter is interposed between the input circuit and the communication unit.

14 Claims, 7 Drawing Sheets

(52) U.S. Cl.
CPC ....... *B60L 11/1846* (2013.01); *B60L 11/1861* (2013.01); *B60R 16/0231* (2013.01); *H04B 3/548* (2013.01); *B60L 2210/30* (2013.01); *B60L 2240/527* (2013.01); *B60L 2270/147* (2013.01); *H04B 2203/547* (2013.01); *H04B 2203/5416* (2013.01); *Y02T 10/7005* (2013.01); *Y02T 10/705* (2013.01); *Y02T 10/7044* (2013.01); *Y02T 10/7072* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 5,686,806 A | | 11/1997 | Hibbard |
| 6,019,779 A | | 2/2000 | Thorud et al. |
| 6,091,779 A | | 7/2000 | Griessbach |
| 6,181,177 B1 | | 1/2001 | Chapman |
| 6,278,103 B1 | | 8/2001 | Takami |
| 6,278,357 B1 | | 8/2001 | Croushore et al. |
| 6,285,744 B1 | | 9/2001 | Nero, Jr. et al. |
| 6,339,204 B1 | | 1/2002 | Kato et al. |
| 6,559,560 B1 | | 5/2003 | Jin et al. |
| 9,197,290 B2 * | | 11/2015 | Komatsu ............. H04B 3/54 |
| 2001/0002791 A1 | | 6/2001 | Tsuge et al. ............. 324/174 |
| 2002/0057164 A1 | | 5/2002 | Jin et al. |
| 2002/0171535 A1 | | 11/2002 | Cern |
| 2003/0063900 A1 | | 4/2003 | Wang et al. |
| 2003/0076221 A1 * | | 4/2003 | Akiyama ......... H04L 12/40182 340/12.32 |
| 2003/0095036 A1 | | 5/2003 | Wasaki et al. |
| 2004/0238495 A1 | | 12/2004 | Byerly et al. |
| 2005/0251369 A1 | | 11/2005 | DeCarlo et al. |
| 2006/0119573 A1 | | 6/2006 | Grant et al. ............. 345/156 |
| 2006/0160488 A1 | | 7/2006 | Sueoka et al. ............. 455/41.2 |
| 2006/0170285 A1 | | 8/2006 | Morimitsu et al. |
| 2006/0192537 A1 | | 8/2006 | Hagen et al. |
| 2006/0232095 A1 | | 10/2006 | Sedighzadeh |
| 2007/0017691 A1 | | 1/2007 | Izumida et al. |
| 2007/0076666 A1 | | 4/2007 | Riveiro et al. |
| 2007/0201542 A1 | | 8/2007 | Hertel et al. |
| 2008/0175028 A1 | | 7/2008 | Stefanutti et al. |
| 2009/0102433 A1 | | 4/2009 | Kamaga |
| 2009/0255742 A1 | | 10/2009 | Hansen |
| 2009/0280757 A1 | | 11/2009 | Zhu et al. |
| 2010/0303263 A1 | | 12/2010 | Hiensch |
| 2011/0127956 A1 | | 6/2011 | Mitsutani |
| 2011/0134976 A1 | | 6/2011 | Fossion et al. |
| 2011/0207358 A1 | | 8/2011 | Ichikawa et al. |
| 2012/0001494 A1 | | 1/2012 | Urano |
| 2012/0002714 A1 | | 1/2012 | Varadarajan et al. |
| 2012/0029728 A1 | | 2/2012 | Hirayama et al. |
| 2013/0154362 A1 | | 6/2013 | Takaka et al. |
| 2014/0192910 A1 | | 7/2014 | Okada et al. |
| 2014/0247893 A1 | | 9/2014 | Komatsu et al. |
| 2014/0254694 A1 | | 9/2014 | Okada et al. |

FOREIGN PATENT DOCUMENTS

| | | | |
|---|---|---|---|
| JP | 55-66459 U | | 10/1978 |
| JP | S61136327 A | | 6/1986 |
| JP | 2003-218754 A | | 7/2003 |
| JP | 2004-304365 A | | 10/2004 |
| JP | 2004-532562 A | | 10/2004 |
| JP | 2007013812 A | | 1/2007 |
| JP | 2009-106053 A | | 5/2009 |
| JP | 2010-123284 A | | 6/2010 |
| JP | 2011-109821 A | | 6/2011 |
| JP | 2011109821 A | * | 6/2011 |
| JP | 2011-172363 A | | 9/2011 |
| JP | 2012-034484 A | | 2/2012 |
| JP | 2012-151824 A | | 8/2012 |
| JP | 2013-038760 A | | 2/2013 |
| JP | 55-66459 B2 | | 8/2014 |
| KR | 10-2009-0066385 A | | 6/2009 |
| KR | 10-2009-0110789 A | | 10/2009 |
| WO | 02-080396 A1 | | 10/2002 |
| WO | 2010/055379 A2 | | 5/2010 |
| WO | 2012/176832 A1 | | 12/2012 |
| WO | 2012/176833 A1 | | 12/2012 |
| WO | 2013/008903 A1 | | 1/2013 |
| WO | 2013/008921 A1 | | 1/2013 |
| WO | 2013/008922 A1 | | 1/2013 |

OTHER PUBLICATIONS

Cyriacus Bleijs, Low-cost charging systems with full communication capability, May 13-16, 2009, EVS24.*
International Search Report dated Aug. 21, 2012 issued in International Patent Application No. PCT/JP2012/067895.
International Search Report dated Jul. 24, 2012 issued in International Patent Application No. PCT/JP2012/065845 (English translation thereof).
International Search Report dated Jul. 24, 2012 issued in International Patent Application No. PCT/JP2012/065847 (English translation thereof).
Granado, J. et al 2010. Modeling Airfield Ground Lighting Systems for Narrowband Power-Line Communications. IEEE Transactions on Power Delivery, vol. 25, No. 4, Oct. 2010.
European Patent Office. 2014. Extended European Search Report, dated Nov. 24, 2014, for EP Application No. 12801935.3.
USPTO, Office Action, dated Mar. 25, 2015, for U.S. Appl. No. 14/128,528.
USPTO, Notice of Allowance, dated Jul. 21, 2015, for U.S. Appl. No. 14/128,528.
USPTO, Office Action, dated Sep. 17, 2015, for U.S. Appl. No. 14/128,517.
Japan Patent Office. Office Action for Japanese Patent Application 2013-523992, dated Sep. 29, 2015.
USPTO. Office Action, dated Nov. 2, 2015, for U.S. Appl. No. 14/232,202, filed Feb. 10, 2015, Ryou Okada, inventor, entitled "Communication System and Communication Device."
USPTO. Oct. 26, 2015. Supplemental Notice of Allowability issued in U.S. Appl. No. 14/128,528, filed May 1, 2014 (now U.S. Pat. No. 9,197,290, issued Nov. 24, 2015).
USPTO. Jan. 14, 2016. Final Office Action issued in U.S. Appl. No. 14/128,517, filed May 7, 2014.
Office Action U.S. Appl. No. 14/232,202 dated May 25, 2016.
Supplementary European Search Report EP Application No. 12812102.7 dated Jun. 14, 2016.
Office Action U.S. Appl. No. 14/128,517 dated Jun. 13, 2016.
SAE EV Changing Systems Committee, "SAE J1772", Oct. 30, 1996, 30 pgs.
SAE International (Society of Automotive Engineers International), "Surface Vehicle Recommended Practice," Jan. 2010.
C. Bleijs, "Low-cost charging systems with full communication capability," EVS 24 International Battery, Hybrid and Fuel Cell Electric Vehicle Symposium, [online] May 13, 2009, EVS-24-Stavanger, Norway, pp. 1-9, Internet: URL: http://www.ecs-five.ch/parkcharge/documents/low_cost.pdf.

(56) References Cited

OTHER PUBLICATIONS

M.A. Mannah, et al., "Power Line Communication Over Feeder Cables in an Industrial Environment," IEEE International Symposium on Power Line Communications and Its Applications, 2009, ISPLC, Mar. 29, 2009, pp. 255-260.
P. Van Den Bossche, et al., "Trends and Development Status of IEC Global Electric Vehicle Standards," Journal of Asian Electric Vehicle, Dec. 2010, vol. 8, No. 2, pp. 1409-1414, [retrieval date Jul. 13, 2012], Internet: <URL:http://www.union-services.com/aevs/1409-1414.pdf>.
International Search Report of PCT/JP2012/067960 dated Aug. 21, 2012.
SAE International (Society of Automotive Engineers International), Surface Vehicle Recommended Practice, J2931/4 Jul. 2012.
Chinese Office Action dated May 25, 2015 issued in Chinese Patent Application No. 2012800339560 (English translation).
Notice of Allowance U.S. Appl. No. 14/232,202 dated Oct. 5, 2016.
Final Office Action U.S. Appl. No. 14/128,517 dated Nov. 30, 2016.
Non-Final Office Action U.S. Appl. No. 14/128,517 dated Mar. 20, 2017.
Advisory Action U.S. Appl. No. 14/128,517 dated Feb. 27, 2017.

\* cited by examiner

COMMUNICATION SYSTEM AND COMMUNICATION DEVICE

CROSS-REFERENCE TO RELATED APPLICATIONS

This application is the national phase under 35 U.S.C. §371 of PCT International Application No. PCT/JP2012/067960 which has an International filing date of Jul. 13, 2012 and designated the United States of America.

BACKGROUND

Technical Field

The present invention relates to a communication system for performing communication between a vehicle such as an electric vehicle or a hybrid vehicle and a power feeding device for feeding power to the vehicle, and to a communication device constituting the communication system.

Description of Related Art

In recent years, environmental technology has increasingly attracted attentions as a technique for addressing global warming. Such environmental technology includes, for example, an electric vehicle or a hybrid vehicle, which has been put into practical use, with a motor employed as a drive unit instead of a conventional engine consuming gasoline.

A vehicle such as an electric vehicle or a hybrid vehicle described above has a structure in which a charge plug connected to an external power feeding device is further connected to a connector at a power feeding port provided on a vehicle so that a secondary battery may be charged from the outside of the vehicle.

An interface between a vehicle and a power feeding device (charging station) in feeding power to the vehicle has already been standardized. For example, a signal line called a control pilot line is provided between an output circuit located on the power feeding device side and an input circuit located on the vehicle side, a rectangular wave signal (control pilot signal) of a predetermined frequency is output from the output circuit to the input circuit, allowing both the power feeding device and the vehicle to recognize information on the charge state of the vehicle and the like (see SAE International (Society of Automotive Engineers International), SURFACE VEHICLE RECOMMENDED PRACTICE, 2010-01).

Meanwhile, such a communication system has also been discussed that is able to further perform transmission and reception of various kinds of information between the power feeding device and the vehicle by superimposing a communication signal onto a control pilot line.

SUMMARY

To the output terminal and input terminal of each of an output circuit and an input circuit transmitting and receiving control pilot signals, however, a capacitor for removing noise and the like is connected. Such a capacitor located at the output circuit or input circuit attenuates communication signals even if the communication signals are superimposed onto the control pilot line, which may possibly reduce the communication speed or noise immunity. Further, when a communication circuit for superimposing communication signals is connected to a control pilot line, the communication circuit may prevent reliable transmission of control pilot signals.

The present invention has been made in view of the above circumstances. An object of the invention is to provide a communication system that can suppress attenuation of communication signals superimposed onto a control pilot line, and to provide a communication device constituting the communication system.

A communication system according to the first aspect of the invention including an output circuit provided in a power feeding device for feeding power to a vehicle and outputting a rectangular wave signal of a predetermined frequency, and an input circuit provided in the vehicle and connected with the output circuit through a plurality of signal lines, the rectangular wave signal output by the output circuit being input to the input circuit, the communication system performing communication between the vehicle and the power feeding device by superimposing a communication signal onto the signal lines, is characterized by comprising: a first communication unit provided in the power feeding device, connected between the signal lines through a first bandpass filter, and performing transmission and reception of a communication signal; a second communication unit provided in the vehicle, connected between the signal lines through the second bandpass filter, and performing transmission and reception of a communication signal; a first low pass filter interposed between the output circuit and the first communication unit; and a second low pass filter interposed between the input circuit and the second communication unit.

The communication system according to the second aspect of the invention is characterized in that, in the first aspect of the invention, each of the first and second low pass filters includes an inductor connected in series with the signal line.

The communication system according to the third aspect of the invention is characterized in that, in the second aspect of the invention, each of the first and second low pass filters includes a resistance connected in parallel with the inductor.

The communication system according to the fourth aspect of the invention is characterized in that, in the second aspect of the invention, each of the first and second low pass filters includes a resistance connected in series with the inductor.

The communication system according to the fifth aspect of the invention is characterized in that, in the second aspect of the invention, each of the first and second low pass filters includes a serial circuit of a capacitor and a resistance between signal lines on one end of the inductor.

The communication system according to the sixth aspect of the invention is characterized in that, in any one of the first to fifth aspects of the invention, the output circuit is configured to output a rectangular wave signal of 1 kHz, and rise time and fall time of the rectangular wave signal on an input side of the input circuit correspond to 10 μs or shorter.

A communication device according to the seventh aspect of the invention, including an output circuit outputting a rectangular wave signal of a predetermined frequency through a plurality of signal lines, is characterized by comprising: a communication unit connected between the signal lines through a bandpass filter, and performing transmission and reception of a communication signal by superimposing a communication signal onto the signal lines; and a low pass filter interposed between the output circuit and the communication unit.

The communication device according to the eighth aspect of the invention is, in the seventh aspect of the invention, characterized by comprising: a generation unit generating the rectangular wave signal; a voltage detection unit detecting an output voltage of the output circuit; and an adjustment unit adjusting a rectangular wave signal generated by the generation unit in accordance with the voltage detected by the voltage detection unit.

A communication device according to the ninth aspect of the invention, including an input circuit to which a rectangular wave signal of a predetermined frequency is input through a plurality of signal lines, is characterized by comprising: a communication unit connected between the signal lines through a bandpass filter, and performing transmission and reception of a communication signal by superimposing a communication signal onto the signal lines; and a low pass filter interposed between the input circuit and the communication unit.

The communication device according to the tenth aspect of the invention is, in the ninth aspect of the invention, characterized by further comprising: a resistance unit having a plurality of resistances and capable of adjusting a resistance value; and an adjustment unit adjusting a resistance value of the resistance unit so as to change a voltage of the resistance unit.

In the first, seventh and ninth aspects of the invention, the first communication unit is installed in a power feeding device, connected between signal lines (control pilot line and ground line, for example) between an output circuit and an input circuit through the first bandpass filter, and performs transmission and reception of communication signals by superimposing the communication signals onto the signal lines. The second communication unit is installed in a vehicle, connected between signal lines between an output circuit and an input circuit through the second bandpass filter, and performs transmission and reception of communication signals by superimposing the communication signals onto the signal lines. In other words, a serial circuit of the first communication unit and the first bandpass filter is connected between signal lines, while a serial circuit of the second communication unit and the second bandpass filter is connected between signal lines. The first and second communication units perform communication by superimposing communication signals onto signal lines through bandpass filters. The communication band for the first and second bandpass filters, i.e. the communication band used by the first and second communication units, may be in the range of, for example, 2 to 30 MHz (Home Plug Green PHY). The band is however not limited thereto and may also be in the range of 150 kHz to 450 kHz, 1.75 MHz to 1.8 MHz, or the like. Moreover, it is not necessary to insulate the control pilot line, the first communication unit and the first bandpass filter from one another, or the control pilot line, the second communication unit and the second bandpass filter from one another, by means of a voltage transformer or the like.

The first low pass filter is interposed between the output circuit and the first communication unit, whereas the second low pass filter is interposed between the input circuit and the second communication unit. The first and second low pass filters are filters allowing rectangular wave signals of a predetermined frequency (1 kHz, for example) output by the output circuit to pass through, while not allowing communication signals (2 to 30 MHz, for example) transmitted and received by the first and second communication units to pass through. By placing the first low pass filter between the first communication unit and the output circuit, the communication signals transmitted by the first communication unit is conveyed to the second communication unit without being attenuated due to the capacitors in the output circuit and input circuit. Moreover, by placing the second low pass filter between the second communication unit and the input circuit, the communication signals transmitted by the second communication unit is conveyed to the first communication unit without being attenuated due to the capacitors in the input circuit and output circuit, thereby suppressing attenuation of the communication signals superimposed onto a control pilot line.

In the second aspect of the invention, each of the first and second low pass filters includes an inductor connected in series with the signal line. The inductor has low impedance for a predetermined frequency (1 kHz, for example) of a rectangular wave output by the output circuit, and has high impedance for communication signals (2 to 30 MHz, for example) transmitted and received by the first and second communication units. Accordingly, communication signals transmitted and received by the first and second communication units may be blocked while control pilot signals may be passed through with a simple configuration.

In the third aspect of the invention, each of the first and second low pass filters includes a resistance connected in parallel with an inductor. The resistance allows, for example, the Q factor (Quality factor) representing the sharpness of the peak in oscillation of the oscillation circuit formed between an inductor and a capacitor present in an output circuit or input circuit to be smaller, suppressing unnecessary oscillation.

In the fourth aspect of the invention, each of the first and second low pass filters includes a resistance connected in series with an inductor. The resistance allows, for example, the Q factor (Quality factor) representing the sharpness of the peak in oscillation of the oscillation circuit formed between an inductor and a capacitor present in an output circuit or input circuit to be smaller, suppressing unnecessary oscillation.

In the fifth aspect of the invention, each of the first and second low pass filters includes a serial circuit of a capacitor and a resistance between signal lines on one end of an inductor. This allows the Q factor (Quality factor) representing the sharpness of the peak in oscillation of the oscillation circuit formed between an inductor and a capacitor present in an output circuit or input circuit to be smaller, suppressing unnecessary oscillation.

In the sixth aspect of the invention, an output circuit outputs a rectangular wave signal of 1 kHz. The rise time and fall time of a rectangular wave signal at the input side of an input circuit is 10 μs or shorter. The rise time corresponds to the time required for a rectangular wave signal to reach 90% from 10%. The fall time corresponds to the time required for a rectangular wave signal to reach 10% from 90%. In order to make the rise time and fall time correspond to 10 μs or shorter, the values (value in the inductor or resistance, for example) for the first and second low pass filters may be set to certain values. If the rise time and fall time exceed 10 μs, the rectangular wave signal received by the input circuit is distorted, inhibiting correct reception of a control pilot signal. By making the rise time and fall time correspond to 10 μs or shorter, the distortion in a rectangular wave signal is reduced and a control pilot signal may correctly be received.

In the eighth aspect of the invention, the communication device includes a generation unit generating a rectangular wave signal (control pilot signal), a voltage detection unit detecting a voltage output from an output circuit and an adjustment unit adjusting a rectangular wave signal generated by the generation unit in accordance with the voltage detected by the voltage detection unit. The rectangular wave signal is a signal with the duty ratio changeable from 0 to 100% and includes, for example, a constant voltage of ±12V. This allows the output circuit to output a desired control pilot signal.

In the tenth aspect of the invention, the communication device has resistance unit having a plurality of resistances and capable of adjusting a resistance value, and an adjustment unit adjusting a resistance value in the resistance unit for changing a voltage of the resistance unit. Thus, for example, in accordance with the state of a vehicle, the resistance value of the resistance unit may be adjusted and the voltage of the resistance unit may be changed to a desired value.

According to the present invention, communication signals are superimposed onto a control pilot line to achieve reliable communication.

The above and further objects and features of the invention will more fully be apparent from the following detailed description with accompanying drawings.

DETAILED DESCRIPTION

Embodiment 1

Figure 1:
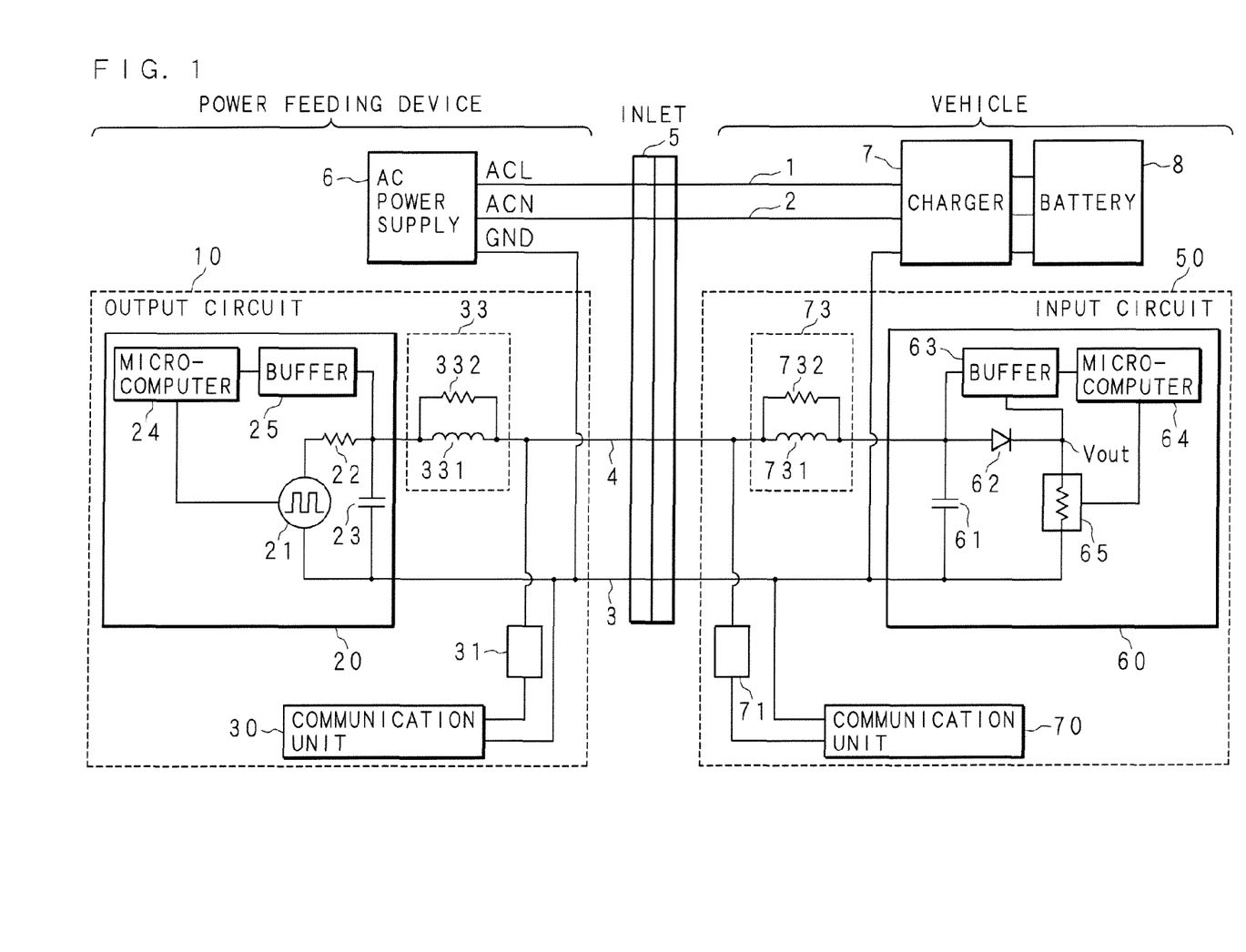
FIG. 1 is a block diagram illustrating an example of a configuration of a communication system according to Embodiment 1.

The present invention will be described below with reference to the drawings illustrating an embodiment of a communication system according to the present invention. FIG. 1 is a block diagram illustrating an example of a configuration of a communication system according to Embodiment 1. As illustrated in FIG. 1, a vehicle such as an electric vehicle or a hybrid vehicle and a power feeding device are electrically connected with each other through an inlet 5 (also referred to as "feeding port" or "connector"). The power feeding device includes an AC power supply 6. The AC power supply 6 is electrically connected to a charger 7 in a vehicle through a power line 1 (ACL) and a power line 2 (ACN). The charger 7 is connected to a battery (secondary battery) 8.

Thus, when a plug (not shown) connected to a charge cable extending from the power feeding device is connected to the inlet 5, AC power may be supplied to a vehicle and the battery 8 mounted on a vehicle may be charged.

The communication system according to the present embodiment includes, for example, a communication device 10 installed in a power feeding device and a communication device 50 installed in a vehicle.

The communication device 10 includes an output circuit 20 outputting a rectangular wave signal (also referred to as "control pilot signal") of a predetermined frequency, a communication unit 30 as the first communication unit, the first bandpass filter 31, the first low pass filter 33 and the like.

The communication device 50 includes an input circuit 60 to which a control pilot signal is input, a communication unit 70 as the second communication unit, the second bandpass filter 71, the second low pass filter 73 and the like.

The output circuit 20 includes a voltage source 21 as a generation unit generating a rectangular wave signal (control pilot signal), a resistance 22, a capacitor 23, a microcomputer 24, a buffer 25 and the like. The voltage source 21 may generate a rectangular wave signal (control pilot signal) with, for example, the frequency of 1 kHz and the peak value of ±12V. The duty ratio of the control pilot signal may be, for example, 20%, but not limited thereto. The rectangular wave signal is a signal with the duty ratio changeable from 0 to 100%, and includes a constant voltage of ±12V.

The output circuit 20 sends out a control pilot signal to the input circuit 60 placed in a vehicle through the resistance 22.

The capacitor 23 is provided in order to reduce noise generated at the output circuit 20, for example. Though the value of the resistance 22 may be 1.0 kΩ for example, and the capacitance of the capacitor 23 may be 2.2 nF for example, the numeric values are not limited to the above examples.

The buffer 25 functions as a voltage detection unit detecting a voltage output from the output circuit 20, to detect voltage between both ends, i.e. both-end voltage of the capacitor 23, and to output the result of detection to the microcomputer 24.

The microcomputer 24 functions as an adjustment unit adjusting a rectangular wave signal generated at the voltage source 21. This allows the output circuit 20 to output a constant voltage of ±12V and a rectangular wave signal (control pilot signal) with an arbitrary duty ratio (larger than 0 and smaller than 100) and the crest value of ±12V.

The input circuit 60 includes a capacitor 61, a diode 62, a buffer 63, a microcomputer 64, a resistance unit 65 and the like. The buffer 63 detects both-end voltage Vout of the resistance unit 65 and outputs it to the microcomputer 64. Note that the both-end voltage of the capacitor 61 may also be detected instead of the both-end voltage of the resistance unit 65.

The resistance unit 65 includes a plurality of resistances, switches and the like, and changes (adjusts) the resistance value by opening and closing the switches based on the signals from the microcomputer 64.

The microcomputer 64 functions as an adjustment unit for adjusting the resistance value of the resistance unit 65 in order to change the voltage Vout of the resistance unit 65. In other words, the microcomputer 64 changes the resistance value of the resistance unit 65 in order to change the voltage Vout in accordance with the state of a vehicle (a state related to charging, for example). In accordance with the value of the voltage Vout, the power feeding device and the vehicle are able to detect a state related to charging.

For example, the voltage Vout of 12V indicates a state where the charge plug for the vehicle is unconnected. When the voltage Vout is 9V, the resistance value of the resistance unit 65 is set to 2.74 kΩ and the charge plug of the vehicle is connected, indicating the state of waiting for charge. Furthermore, when the voltage Vout is 6V, the resistance value of the resistance unit 65 is set to 882Ω, indicating the state of being charged. When the voltage Vout is 3V, the resistance value of the resistance unit 65 is set to 246Ω, indicating the state where it is being charged and the place of charging needs to be ventilated.

The capacitor 61 is provided, for example, in order to reduce noise entering the input circuit 60. Though the resistance value of the resistance unit 65 is, for example, approximately 2.74Ω, 882Ω and 246Ω, and the capacitance of the capacitor 61 is, for example, 1.8 nF, the numeric values are not limited to the above examples.

The output circuit 20 and the input circuit 60 are electrically connected with each other through multiple signal lines (control pilot line 4 and ground line 3). It is noted that the ground line 3 may also be regarded as a control pilot line.

The communication units 30 and 70 perform communication by superimposing a predetermined communication signal onto signal lines (control pilot line 4 and ground line 3) located between the output circuit 20 and the input circuit 60. The information transmitted and received between the communication units 30 and 70 has more variety than the information transmitted by control pilot signals, and includes, for example, information related to a vehicle ID, that related to charge control (start, end or the like of charging), that related to management of the amount of charge (notification of charge amount, rapid charging or the like), that related to management of accounting, that related to updating of navigation, and so forth.

The communication units 30 and 70 include, for example, a modulation circuit and a decoding circuit using a modulation scheme such as Orthogonal Frequency Domain Multiplex (OFDM), frequency spreading (SS: Spread Spectrum) and the like.

The communication band for communication performed by the communication units 30 and 70 may be in the range of 2 to 30 MHz (Home Plug Green PHY, for example). It is however not limited thereto and may also be in the range of 150 kHz to 450 kHz (G3), 1.75 MHz to 1.8 MHz (FSK: frequency shift keying) or the like.

The communication unit 30 is connected through the bandpass filter 31 between the control pilot line 4 and the ground line 3 on the output side of the output circuit 20. That is, a serial circuit of the bandpass filter 31 and the communication unit 30 is connected between the control pilot line 4 and the ground line 3 on the output side of the output circuit 20. Note that no voltage transformer or the like is used. The communication unit 30 superimposes communication signals onto the control pilot line 4 through the bandpass filter 31, while receiving communication signals on the control pilot line 4.

The communication unit 70 is connected through the bandpass filter 71 between the control pilot line 4 and the ground line 3 on the input side of the input circuit 60. That is, a serial circuit of the bandpass filter 71 and the communication unit 70 is connected between the control pilot line 4 and the ground line 3 on the input side of the input circuit 20. The communication unit 70 superimposes communication signals onto the control pilot line 4 through the bandpass filter 71, while receiving communication signals on the control pilot line 4.

In other words, the communication units 30 and 70 are directly connected between signal lines through the bandpass filters 31 and 71, and perform communication by superimposing communication signals onto the signal lines. Such a scheme may be referred to as "direct scheme" or "capacitive scheme."

The communication band for the bandpass filters 31 and 71 may be in the range of 2 to 30 MHz (Home Plug Green PHY, for example). It is however not limited thereto and may also be in the range of 150 kHz to 450 kHz (G3), 1.75 MHz to 1.8 MHz (FSK: frequency shift keying) or the like.

On the control pilot line 4 between the output circuit 20 and a connection point at which the communication unit 30 is connected through the bandpass filter 31, a low pass filter 33 is interposed.

Furthermore, on the control pilot line 4 between the input circuit 60 and a connection point at which the communication unit 70 is connected through the bandpass filter 71, the low pass filter 73 is interposed.

The low pass filters 33 and 73 are filters allowing rectangular wave signals (control pilot signals) of a predetermined frequency (1 kHz, for example) output by the output circuit 20 to pass through and not allowing communication signals (2 to 30 MHz, for example) transmitted and received by the communication units 30 and 70 to pass through.

By placing the low pass filter 33 between the communication unit 30 and the output circuit 20, the communication signals transmitted by the communication unit 30 are conveyed to the communication unit 70 without being attenuated by the capacitor 23 in the output circuit 20. Moreover, the communication signals transmitted by the communication unit 70 is conveyed to the communication unit 30 without being attenuated by the capacitor 23 in the output circuit 20.

Furthermore, by placing the low pass filter 73 between the communication unit 70 and the input circuit 60, the communication signals transmitted by the communication unit 70 are conveyed to the communication unit 30 without being attenuated by the capacitor 61 in the input circuit 60. Moreover, the communication signals transmitted by the communication unit 30 is conveyed to the communication unit 70 without being attenuated by the capacitor 61 in the input circuit 60, so that communication may reliably be performed by superimposing communication signals onto the control pilot line 4.

The low pass filter 33 includes an inductor 331 connected in series with the control pilot line 4. The inductance of the inductor 331 may be 470 μH, for example, but is not limited thereto.

For a predetermined frequency (1 kHz, for example) output by the output circuit 20, the inductor 331 has low impedance. Moreover, the inductor 331 has high impedance for communication signals (2 to 30 MHz, for example) transmitted and received by the communication units 30 and 70. Accordingly, with a simple configuration, the communication signals transmitted and received by the communication units 30 and 70 may be blocked while control pilot signals may be passed through.

The low pass filter 73 includes an inductor 731 connected in series with the control pilot line 4. The inductance of the inductor 731 may be 470 μH, for example, but is not limited thereto.

For a predetermined frequency (1 kHz, for example) output by the output circuit 20, the inductance 731 has low impedance. On the other hand, the inductor 731 has high impedance for the communication signals (2 to 30 MHz, for example) transmitted and received by the communication units 30 and 70. Accordingly, with a simple configuration, communication signals transmitted and received by the communication units 30 and 70 are blocked while the control pilot signals may be passed through.

In addition, the low pass filter 33 includes a resistance 332 connected in parallel with the inductor 331. Though the resistance value of the resistance 332 is 470Ω, for example, it is not limited thereto. The resistance 332 allows the Q factor (Quality factor) representing the sharpness of the peak in oscillation of the oscillation circuit formed between the inductor 331 and the capacitor 23 or the like present in the output circuit 20 to be smaller, suppressing unnecessary oscillation.

Likewise, the low pass filter 73 includes a resistance 732 connected in parallel with the inductor 731. The resistance value of the resistance 732 is 470Ω, for example, it is not limited thereto. The resistance 732 allows, for example, the Q factor (Quality factor) representing the sharpness of the peak in oscillation of the oscillation circuit formed between the inductor 731 and the capacitor 61 or the like present in the input circuit 60 to be smaller, suppressing unnecessary oscillation.

Figure 2:
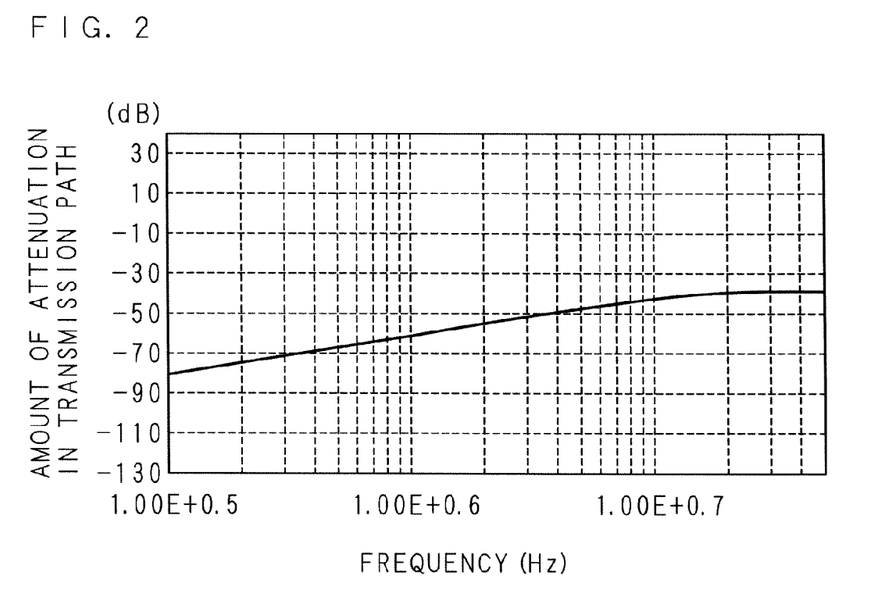
FIG. 2 is an explanatory view illustrating an example of a transmission path attenuation characteristic of communication performed by a communication unit in the case where a low pass filter is not included.
Figure 3:
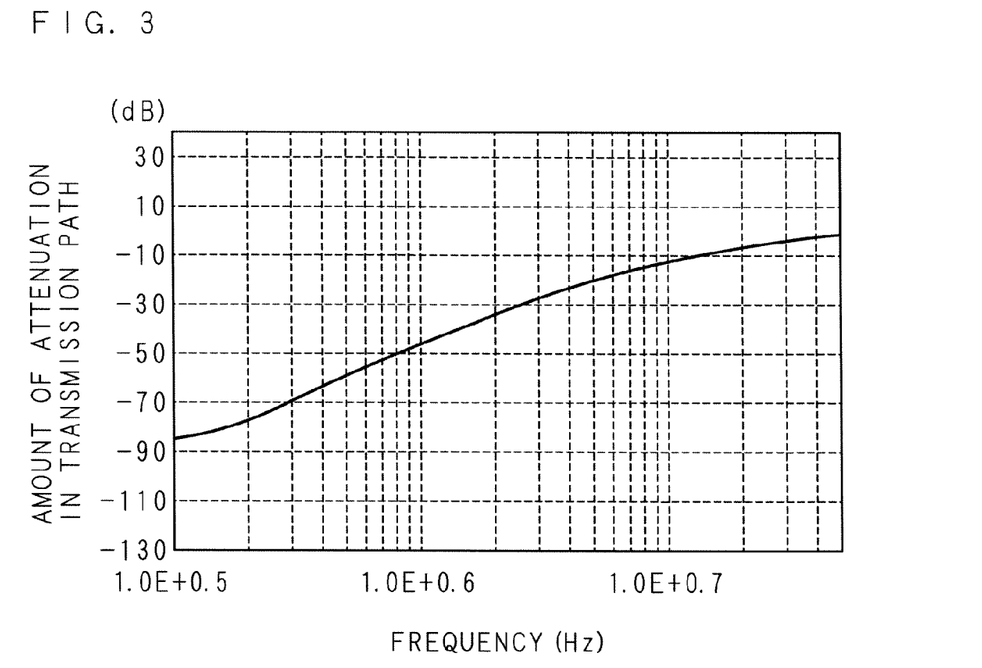
FIG. 3 is an explanatory view illustrating an example of a transmission path attenuation characteristic of communication performed by a communication unit in the case where a low pass filter is included.

FIG. 2 is an explanatory view illustrating an example of a transmission path attenuation characteristic of communication performed by the communication units 30 and 70 in the case where the low pass filters 33 and 73 are not included. FIG. 3 is an explanatory view illustrating an example of a transmission path attenuation characteristic of communication performed by the communication units 30 and 70 in the case where the low pass filters 33 and 73 are included. In FIG. 2 and FIG. 3, the horizontal axis indicates frequency whereas the vertical axis indicates the amount of attenuation in transmission path (reduction in voltage) in the control pilot line 4 between the communication units 30 and 70.

As can be seen from FIG. 2 and FIG. 3, by including the low pass filters 33 and 73, the amount of attenuation for communication signals transmitted by the communication units 30 and 70 is improved within the range of 250 kHz to 50 MHz compared to the case where the low pass filters 33 and 73 are not included. More specifically, the amount of attenuation is improved by approximately 20 dB at 2 MHz and by approximately 35 dB at 30 MHz, meaning that it is improved by approximately 20 dB to 35 dB at the frequency range of 2 to 30 MHz corresponding to the communication band of the communication units 30 and 70.

Figure 4:
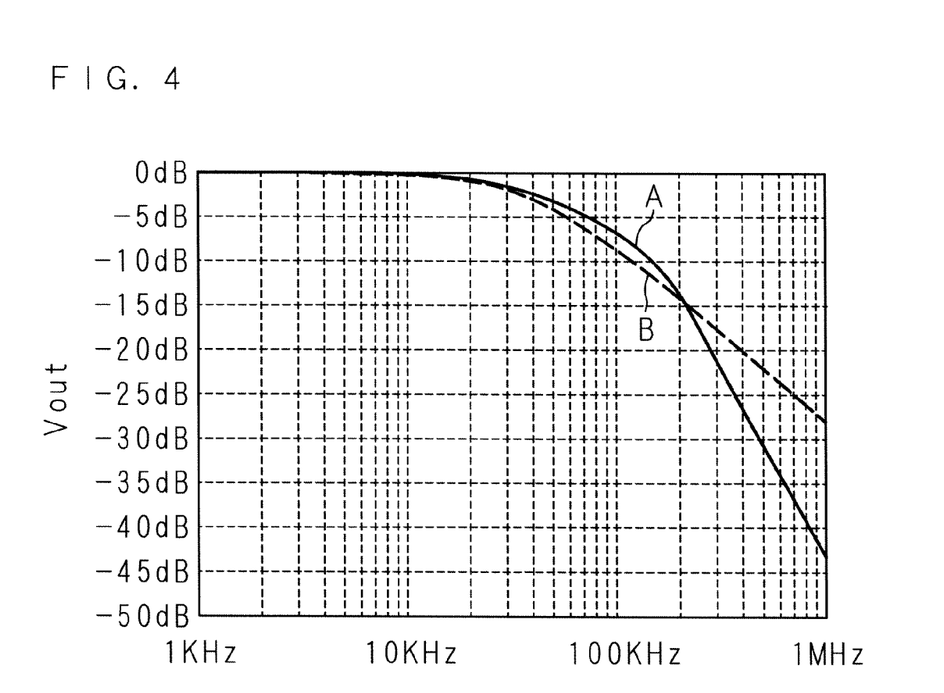
FIG. 4 is an explanatory view illustrating an example of an attenuation characteristic of a control pilot signal output by an output circuit.

FIG. 4 is an explanatory view illustrating an example of an attenuation characteristic of a control pilot signal output by the output circuit 20. In FIG. 4, the horizontal axis indicates frequency whereas the vertical axis indicates frequency spectra of the voltage Vout. Further, in FIG. 4, the curve represented by the code A indicates the case where the low pass filters 33 and 73 are included, while the curve represented by the code B indicates the case where the low pass filters 33 and 73 are not included.

As can be seen from FIG. 4, at the frequency of 20 kHz or less, the attenuation characteristic is the same in both cases regardless of the presence of low pass filters 33 and 73. That is, even in the case where the low pass filters 33 and 73 are included, the signals may pass through without any attenuation up to the twentieth harmonic wave at the frequency of 1 kHz, as in the case where no low pass filters 33 and 73 are included.

In other words, when the frequency of a control pilot signal is set as a basic wave, and the blocking frequency for the low pass filters 33 and 73 is set as, for example, the ninth harmonic (9 kHz) or more, the eleventh harmonic (11 kHz) or more, or the fifteenth harmonic (15 kHz) or more, change in the voltage or distortion in the waveform of a control pilot signal may be suppressed. The larger the blocking frequency is, the more effectively the voltage change or waveform distortion of a control pilot signal is suppressed.

Figure 5:
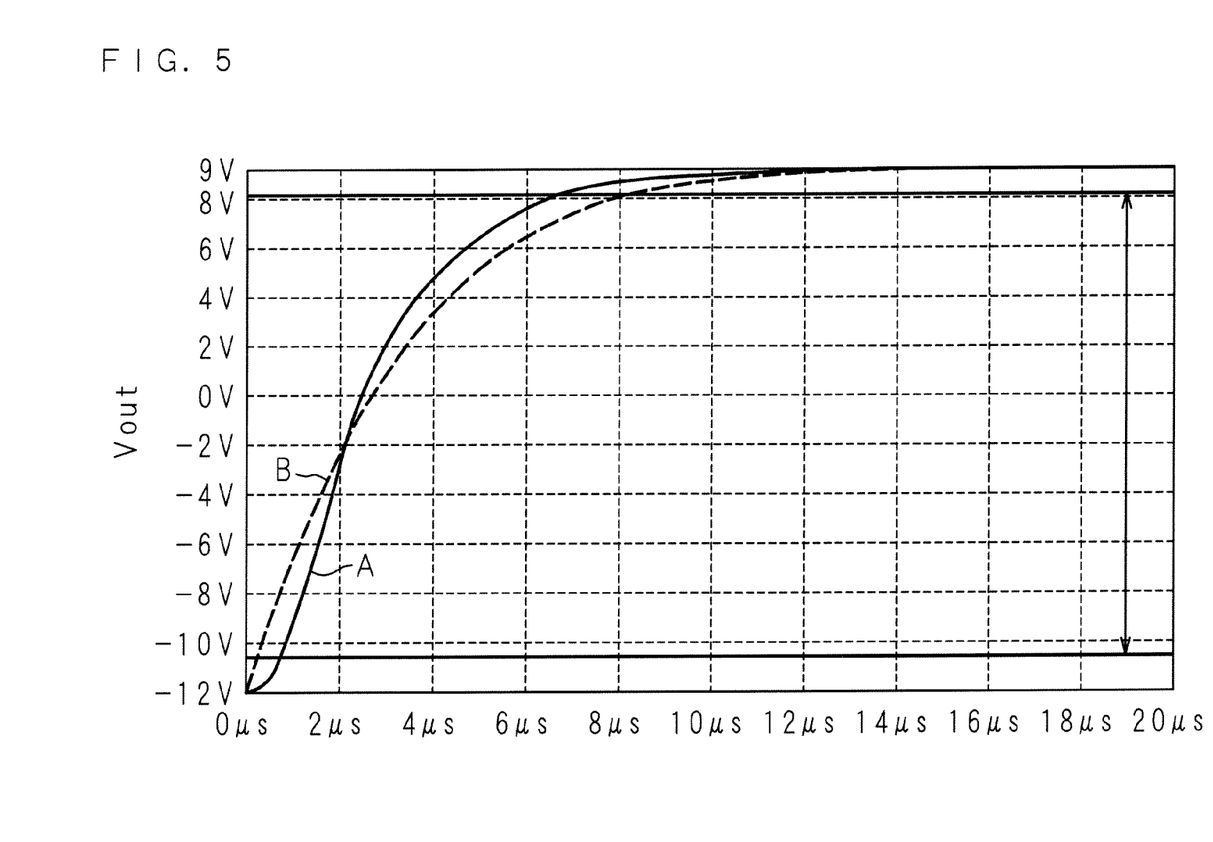
FIG. 5 is an explanatory view illustrating an example of a rising characteristic of a control pilot signal at an input circuit.

FIG. 5 is an explanatory view illustrating an example of a rising characteristic of a control pilot signal at an input circuit 60. In FIG. 5, the horizontal axis indicates time, while the vertical axis indicates the voltage Vout. In FIG. 5, the voltage Vout corresponds to the voltage between both ends (also referred to as both-end voltage) of the capacitor 61. In FIG. 5, the curve represented by the code A indicates the case where the low pass filters 33 and 73 are included, whereas the curve represented by the code B indicates the case where the low pass filters 33 and 73 are not included. Due to the resistance divided voltage for the output circuit 20 and the input circuit 60, the control pilot signal at the input circuit 60 corresponds to +9V and −12V at the rectangular waveform of 1 kHz. Moreover, the rise time corresponds to the time required for the voltage to reach 90% from 10%.

As can be seen from FIG. 5, the rise time is approximately 7.7 μs when the low pass filters 33 and 73 are not included, whereas the rise time is approximately 5.6 μs when the low pass filters 33 and 73 are included. That is, the rise time of a control pilot signal on the input side of the input circuit 60 is 10 μs or shorter.

In order to make the rise time be 10 μs or shorter, the values for the low pass filters 33 and 73 (values of inductors 331 and 731 or the values of resistances 332 and 732) may be set to certain values. If the rise time exceeds 10 μs, distortion in the voltage waveform received by the input circuit 60 becomes too large, inhibiting correct reception of a control pilot signal. By making the rise time be 10 μs or shorter, the distortion in the voltage waveform is reduced and a control pilot signal may correctly be received. That is, a control pilot signal of a rectangular waveform output by the output circuit 20 is transmitted to the input circuit 60 without being distorted. While rise time was described in the example shown in FIG. 5, same applies to fall time.

Figure 6:
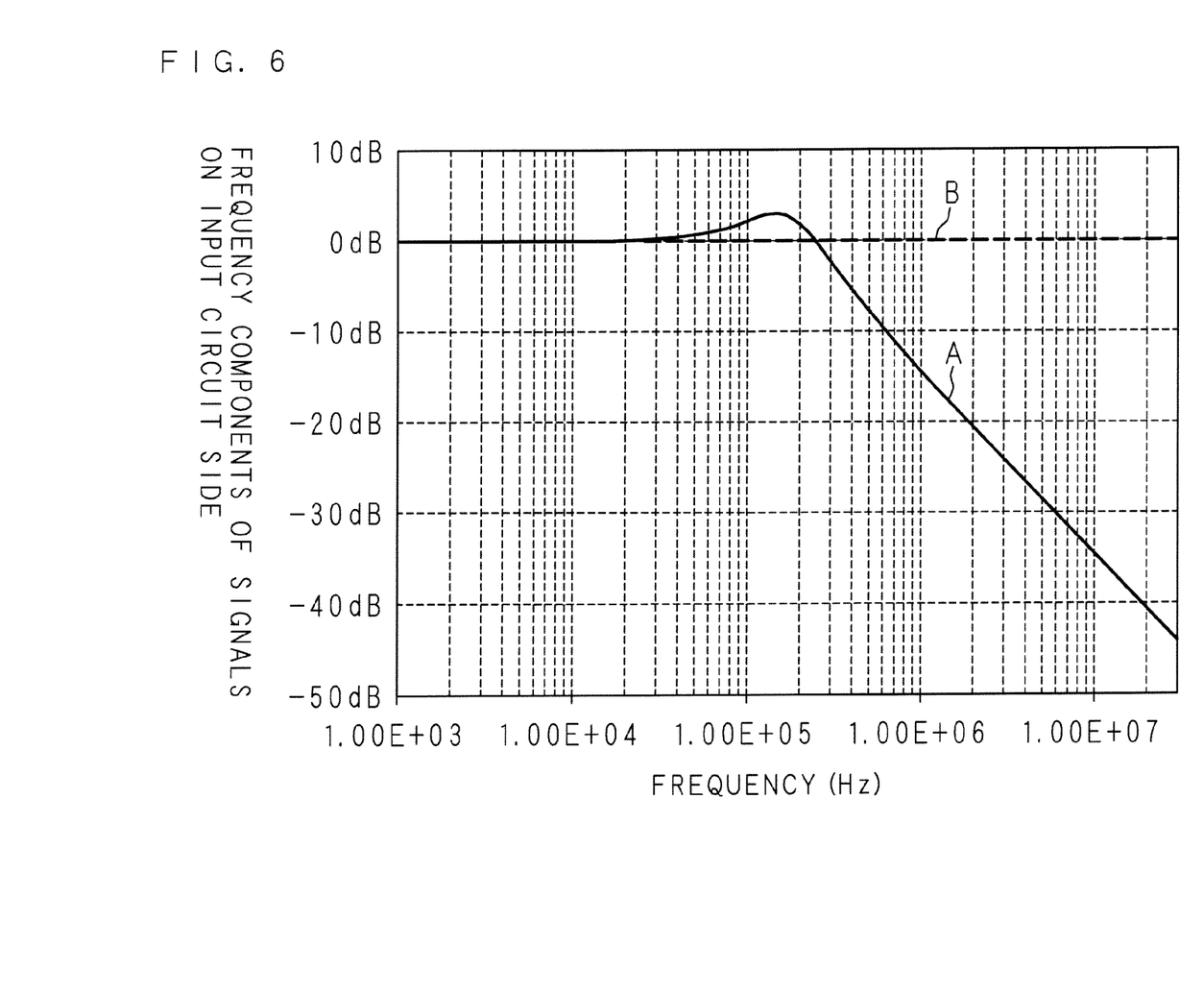
FIG. 6 is an explanatory view illustrating an example of a transmission characteristic on an input circuit side.

FIG. 6 is an explanatory view illustrating an example of a transmission characteristic on an input circuit side. In FIG. 6, the horizontal axis indicates frequency. The vertical axis indicates frequency components of communication signals from the communication units 30 and 70, and of control pilot signals from the output circuit 20 observed at the voltage Vout on the input circuit 60 side. In FIG. 6, the curve represented by the code A shows the case where the low pass filters 33 and 73 are included while the curve represented by the code B shows the case where the low pass filters 33 and 73 are not included.

As can be seen from FIG. 6, when the low pass filters 33 and 73 are not included, the communication signals from the communication units 30 and 70 directly enter the input circuit 60 side without being attenuated, causing the communication signals to act as disturbance noise when the buffer 63 and microcomputer 64 detect voltage (12V, 9V, 6V or 3V, for example), possibly making a mistake in determination of voltage. On the contrary, when the low pass filters 33 and 73 are included, though the communication signals of, for example, 2 to 30 MHz are attenuated to one several-tenths or to one several-hundredth, the control pilot signals may be received at the input circuit 60 with hardly any attenuation or distortion, which has no influence on the determination for duty ratio or voltage of the control pilot signals.

According to the present embodiment, the low pass filters 33 and 73 prevent the communication signals transmitted and received at the communication units 30 and 70 from being attenuated at the output circuit 20 or input circuit 60, thereby suppressing attenuation of the communication signals superimposed onto the control pilot line. Furthermore, reduction in the speed of communication by the communication units 30 and 70 or reduction in noise immunity may also be prevented.

Moreover, even in the state where the low pass filters 33 and 73 are included, variation in the voltage or distortion in the waveform of the control pilot signals output by the output circuit 20 are not caused. In other words, the distortion of the control pilot signals will not be increased, which may prevent an error from occurring in reading the control pilot signals due to the communication signals from the communication units 30 and 70.

In the embodiment above, though the low pass filter is configured by a parallel circuit including an inductor and a resistance, the circuit configuration is not limited thereto but may be configured by an inductor alone or by a serial circuit including an inductor and a resistance. Furthermore, while the signal lines of a control pilot line and a ground line are used as the communication path for the rectangular wave signals or communication signals, a conductor such as a vehicle body or a housing of a power feeding device may be employed for one or both of the signal lines. Moreover, the low pass filter may also have the configuration described below.

Embodiment 2

Figure 7:
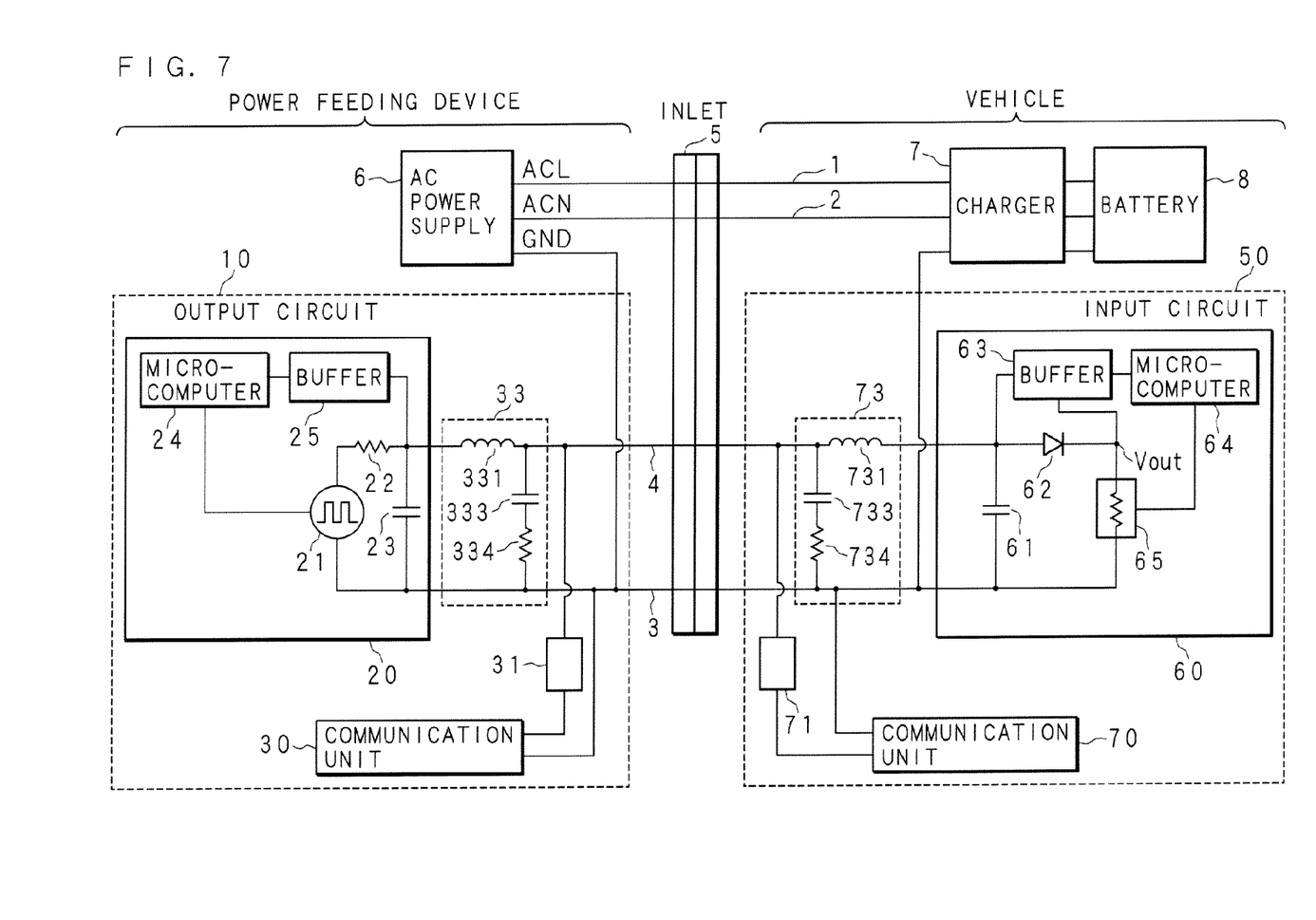
FIG. 7 is a block diagram illustrating an example of a configuration of a communication system according to Embodiment 2.

FIG. 7 is a block diagram illustrating an example of a configuration of a communication system according to Embodiment 2. Embodiment 2 is different from Embodiment 1 in that the low pass filter 33 includes, in place of the resistance 332, a serial circuit of a capacitor 333 and a resistance 334 connected between the control pilot line 4 and the ground line 3. The low pass filter 73 similarly includes, in place of the resistance 732, a serial circuit of a capacitor 733 and a resistance 734 connected between the control pilot line 4 and the ground line 3. It is noted that the parts similar to those in Embodiment 1 will be denoted by the same reference codes and will not be described in detail.

This can reduce the Q factor (Quality factor) representing the sharpness of the peak in oscillation of the oscillation circuit formed between an inductor and a capacitor present in an output circuit or input circuit to be smaller, suppressing unnecessary oscillation.

The present embodiment may be applied to the communication with the communication band in the range of 2 to 30 MHz, though not limited thereto. The present embodiment may also be applied to the communication with the communication band in the range of 150 kHz to 450 kHz, and with the communication band in the range of 1.75 MHz to 1.8 MHz and the like.

The embodiments disclosed herein are to be considered as illustrative, not as restrictive, in all aspects. The scope of the present invention is defined by the appended claims rather than by the description preceding them, and all changes that fall within metes and bounds of the claims, or equivalence of such metes and bounds thereof are therefore intended to be embraced by the claims.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A communication system including an output circuit provided in a power feeding device for feeding power to a vehicle and outputting a rectangular wave signal of a predetermined frequency, and an input circuit provided in the vehicle and connected with the output circuit through a plurality of signal lines, the rectangular wave signal output by the output circuit being input to the input circuit, the communication system performing communication between the vehicle and the power feeding device by superimposing a communication signal onto the signal lines, comprising:
    a first series circuit in the power feeding device, connected between the signal lines, and comprising: a first communication unit, configured to perform transmission and reception of a communication signal, and a first bandpass filter;
    a second series circuit in the vehicle, connected between the signal lines, and comprising: a second communication unit, configured to perform transmission and reception of a communication signal, and a second bandpass filter;
    a first low pass filter interposed between the output circuit and the first communication unit; and
    a second low pass filter interposed between the input circuit and the second communication unit, wherein
    one end of the first communication unit of the first series circuit is directly and only connected to one end of the first bandpass filter, and
    one end of the second communication unit of the second series circuit is directly and only connected to one end of the second bandpass filter.

2. The communication system according to claim 1, wherein
    each of the first and second low pass filters includes an inductor connected in series with the signal line.

3. The communication system according to claim 2, wherein
    each of the first and second low pass filters includes a resistance connected in parallel with the inductor.

4. The communication system according to claim 2, wherein
    each of the first and second low pass filters includes a resistance connected in series with the inductor.

5. The communication system according to claim 2, wherein
    each of the first and second low pass filters includes a serial circuit of a capacitor and a resistance between signal lines on one end of the inductor.

6. The communication system according to 1, wherein
    the output circuit is configured to output a rectangular wave signal of 1 kHz, and
    rise time and fall time of the rectangular wave signal on an input side of the input circuit correspond to 10 µs or shorter.

7. The communication system according to claim 2, wherein
    the output circuit is configured to output a rectangular wave signal of 1 kHz, and
    rise time and fall time of the rectangular wave signal on an input side of the input circuit correspond to 10 µs or shorter.

8. The communication system according to claim 3, wherein the output circuit is configured to output a rectangular wave signal of 1 kHz, and rise time and fall time of the rectangular wave signal on an input side of the input circuit correspond to 10 µs or shorter.

9. The communication system according to claim 4, wherein the output circuit is configured to output a rectangular wave signal of 1 kHz, and rise time and fall time of the rectangular wave signal on an input side of the input circuit correspond to 10 µs or shorter.

10. The communication system according to claim 5, wherein the output circuit is configured to output a rectangular wave signal of 1 kHz, and rise time and fall time of the rectangular wave signal on an input side of the input circuit correspond to 10 µs or shorter.

11. A communication device including an output circuit outputting a rectangular wave signal of a predetermined frequency through a plurality of signal lines, comprising:

a series circuit connected between the signal lines and comprising: a communication unit, configured to perform transmission and reception of a communication signal by superimposing a communication signal onto the signal lines, and a bandpass filter; and a low pass filter interposed between the output circuit and the communication unit, wherein one end of the communication unit of the series circuit is directly and only connected to one end of the bandpass filter.

12. The communication device according to claim 11 further comprising:

a generation unit generating the rectangular wave signal;

a voltage detection unit detecting an output voltage of the output circuit; and an adjustment unit adjusting a rectangular wave signal generated by the generation unit in accordance with the voltage detected by the voltage detection unit.

13. A communication device, including an input circuit to which a rectangular wave signal of a predetermined frequency is input through a plurality of signal lines, comprising:

a series circuit connected between the signal lines and comprising: a communication unit, configured to perform transmission and reception of a communication signal by superimposing a communication signal onto the signal lines, and a bandpass filter; and a low pass filter interposed between the input circuit and the communication unit, wherein one end of the communication unit of the series circuit is directly and only connected to one end of the bandpass filter.

14. The communication device according to claim 13, further comprising:

a resistance unit having a plurality of resistances and capable of adjusting a resistance value; and an adjustment unit adjusting a resistance value of the resistance unit so as to change a voltage of the resistance unit.

* * * * *

UNITED STATES PATENT AND TRADEMARK OFFICE
CERTIFICATE OF CORRECTION

| | |
|---|---|
| PATENT NO. | : 9,735,832 B2 |
| APPLICATION NO. | : 14/232218 |
| DATED | : August 15, 2017 |
| INVENTOR(S) | : Takeshi Hagihara et al. |

It is certified that error appears in the above-identified patent and that said Letters Patent is hereby corrected as shown below:

On the Title Page

Item (73) should read:

SUMITOMO ELECTRIC INDUSTRIES, LTD.
SUMITOMO WIRING SYSTEMS, LTD.
AUTONETWORKS TECHNOLOGIES, LTD.
TOYOTA JIDOSHA KABUSHIKI KAISHA

Signed and Sealed this
Twenty-fourth Day of April, 2018

Andrei Iancu
*Director of the United States Patent and Trademark Office*